(12) United States Patent
Bosch

(10) Patent No.: US 10,326,124 B2
(45) Date of Patent: Jun. 18, 2019

(54) DEVICE AND METHOD FOR REMOVING MOISTURE FROM A BATTERY HOUSING

(71) Applicant: Robert Bosch GmbH, Stuttgart (DE)

(72) Inventor: Andreas Bosch, Oberriexingen (DE)

(73) Assignee: Robert Bosch GmbH, Stuttgart (DE)

( * ) Notice: Subject to any disclaimer, the term of this patent is extended or adjusted under 35 U.S.C. 154(b) by 516 days.

(21) Appl. No.: 15/023,012

(22) PCT Filed: Sep. 5, 2014

(86) PCT No.: PCT/EP2014/068900
§ 371 (c)(1),
(2) Date: Mar. 18, 2016

(87) PCT Pub. No.: WO2015/039885
PCT Pub. Date: Mar. 26, 2015

(65) Prior Publication Data

US 2016/0233482 A1    Aug. 11, 2016

(30) Foreign Application Priority Data

Sep. 18, 2013   (DE) .................. 10 2013 218 700

(51) Int. Cl.
*H01M 2/36*    (2006.01)
*H01M 2/10*    (2006.01)
*H01M 10/42*   (2006.01)

(52) U.S. Cl.
CPC ........... *H01M 2/36* (2013.01); *H01M 2/1077* (2013.01); *H01M 2/362* (2013.01); *H01M 10/42* (2013.01);
(Continued)

(58) Field of Classification Search
CPC ...... H01M 2/36; H01M 2/1077; H01M 2/362; H01M 10/42; H01M 10/4207
See application file for complete search history.

(56) References Cited

U.S. PATENT DOCUMENTS 6,936,375 B2   8/2005  Imamura et al.
7,799,453 B2   9/2010  Santiago et al.
(Continued)

FOREIGN PATENT DOCUMENTS

CN    201849312 U    6/2011
CN    102527199 A    7/2012
(Continued)

OTHER PUBLICATIONS

International Search Report for Application No. PCT/EP2014/068900 dated Nov. 18, 2014 (English Translation, 3 pages).
(Continued)

*Primary Examiner* — Jimmy Vo
(74) *Attorney, Agent, or Firm* — Michael Best & Friedrich LLP

(57) ABSTRACT

The invention relates to a device for removing water from a battery housing (100) or a battery separator, comprising a body (310) having a plurality of capillaries (320₁-320₇) and electrodes (330, 340) for producing an electric field, and a control device (350) for controlling the electric field for removing water through means of the capillaries (320₁-320₇), a battery housing, a battery separator, a battery system, a vehicle, a method, a computer program and a computer program product.

14 Claims, 8 Drawing Sheets

(52) U.S. Cl.
 CPC .... *H01M 10/4207* (2013.01); *H01M 2220/20* (2013.01)

(56) References Cited

U.S. PATENT DOCUMENTS

| | | | |
|---|---|---|---|
| 2002/0045093 A1* | 4/2002 | Imamura | G03B 7/26 429/96 |
| 2004/0074768 A1 | 4/2004 | Anex et al. | |
| 2006/0029851 A1 | 2/2006 | Santiago et al. | |
| 2013/0209844 A1* | 8/2013 | Gless | H01M 2/1077 429/61 |

FOREIGN PATENT DOCUMENTS

| | | |
|---|---|---|
| CN | 102947970 A | 2/2013 |
| WO | 2012171822 A1 | 12/2012 |

OTHER PUBLICATIONS

Zeng et al., "Fabrication and Characterization of Electroosmotic Micropumps," Sensors and Actuators, Bd. 79, May 10, 2001, pp. 107-114, XP002731816.

\* cited by examiner

DEVICE AND METHOD FOR REMOVING MOISTURE FROM A BATTERY HOUSING

BACKGROUND OF THE INVENTION

The invention relates to a device and a method for removing moisture from a battery housing, and to a battery housing, a battery disconnect unit and a battery system. The invention additionally relates to a vehicle, in particular a motor vehicle such as an electric motor vehicle or hybrid vehicle, having the battery system.

It is foreseeable that, both in the case of stationary applications, for example in wind turbines, and in the case of mobile applications, for example in electric motor vehicles (electric vehicles, EV) or hybrid vehicles (hybrid electric vehicles, HEV), new battery systems, for example having lithium-ion accumulators or nickel-metal hydride accumulators, will increasingly be used as rechargeable batteries.

The battery systems must meet very demanding requirements in respect of the usable energy content, charging/discharging efficiency, reliability, service life and the unwanted loss of capacity resulting from frequent partial discharging (Memory Effect).

A battery system comprises a multiplicity of battery cells. Owing to their cell internal resistance and the occurring electrochemical processes, the battery cells heat up during charging and discharging. The battery cells may be connected in series, in order to increase the voltage, and/or in parallel, in order to increase the maximum electric current. The battery cells in this case may be combined to form battery units, or battery modules. When used for driving vehicles, approximately 100 battery cells, for example, may be connected in series or in parallel (as a traction battery). In the case of a high-voltage battery system, the total voltage may thus be, for example 450 V or even 600 V.

The allowable temperature range for the operation of the battery cells is typically between −30° C. and +70° C. In the lower range of the operating temperature, the performance of the battery cells may diminish significantly. Irreversible damage to the battery cells may also occur in this case. If the operating temperature is exceeded, also, the performance of the battery cells may diminish significantly. Likewise, irreversible damage to the battery cells may occur in this case. The damage may result in accelerated aging of the battery cells, or in thermal runaway of the battery cells, which represents a hazard to humans and the environment.

In order to ensure the safety and function of the battery system, it is therefore necessary to operate the battery cells within the prescribed temperature range. On the one hand, during the operation of the battery cells heat is produced, which must be removed in order to avoid heating of the battery cells above the critical maximum temperature. On the other hand, in the case of low temperatures, it may be necessary to heat up the battery cells to a minimum temperature. For the purpose of maintaining the prescribed temperature range, the battery system is tempered, i.e. cooled or heated as appropriate.

For this purpose, the battery system may comprise a fluid, for example a liquid such as alcohol, for example propane-1,2,3,-triol (glycerol, glycerin), oil or water, or a liquid mixture, as a tempering agent in a tempering agent circuit.

If a housing of the battery system is not hermetically sealed (gas-tight), moisture, for example in the form of water vapor, may continuously enter the battery system, for example through seals. Since, during cooling of the battery system, the tempering agent temperature is significantly below the temperature in the housing, condensate (condensation water, condensed water) may form. Consequently, water in liquid form, either pure or as a liquid mixture, may form and/or collect in the battery system. Liquid water, for example raindrops, mist droplets and solid water, for example ice and snow crystals, are not classed as air moisture.

Battery cells may be combined to form battery modules or battery packs. In the case of a battery pack, the battery cells may be disposed in a metallic frame structure, which is disposed in a wrapping of a flexible, watertight plastic film. In this case, the risk of the formation and collection of condensate water (condensation) is increased.

In order to ensure the safety of the battery system, in particular the high-voltage battery system, it may additionally be necessary to be able to break the electric circuit, for example by means of a switching means such as a relay, a contactor, in particular a power contactor, or a switch. The switching means must transmit large currents, for example several 100 A, and also be able to cut out safely. Protection against short-circuit currents may be effected, for example, by means of an overcurrent protective means such as a fuse, in particular a safety fuse. The switching means, the overcurrent protective means and/or a sensor means may be disposed, for example, in the battery system or a battery disconnect unit (BDU).

Owing to temperature differences and/or temperature changes, therefore, there is a risk of condensation water forming in the battery system or in the battery disconnect unit. Owing to the condensation water, there is a risk of damage and/or failure of the electrical and/or electronic components, for example the battery cells, the switching means, the overcurrent protective means and/or the sensor means, as a result of corrosion, and/or a jeopardizing of safety. In the case of an impact caused by an accident, for example, there may therefore be a high safety risk because of the battery system and/or the battery disconnect unit no longer functioning properly. In an extreme case, for example in the case of a short circuit, the battery cells could explode.

In order to ensure the safety and function of a battery system, for example a lithium-ion battery system, it is therefore necessary to prevent the formation of condensation water, or to remove the formed condensation water from the battery system.

SUMMARY OF THE INVENTION

The devices and method according to the invention, have the advantage that water, such as condensation water, can be removed from a battery housing such as a metal housing, for example of aluminum or steel, such as stainless steel, or from a battery system or a battery disconnect unit. Corrosion on the electrical and/or electronic components of the battery system or of the battery disconnect unit, for example on contacts of the components, can thereby be prevented. Furthermore, the specifications for the components, for example in respect of corrosion protection and/or corrosion resistance and/or electrical insulation, can be reduced. The costs, for example production costs and maintenance costs, can therefore be reduced, and resources saved. Furthermore, the proper functioning of the battery system or of the battery disconnect unit can be ensured, and the reliability of the battery system or of the battery disconnect unit can be increased.

Expediently, the device may additionally comprise an obturating means for obturating the body, in particular an obturating means comprising a cover having a latching means and latching springs for latching in the latching means and locking the cover. An uncontrolled discharge of noxious gases can thereby be prevented.

Expediently, the device may additionally have a discharge means, in particular a vacuum discharge means, for discharging the removed water. As a result, the functioning can be simplified and the costs, such as production costs and maintenance costs, can be reduced.

Expediently, the device may additionally comprise a desiccant means, in particular a heatable desiccant means, for absorbing the removed water. As a result, the functioning can be simplified and the costs, such as maintenance costs, can be reduced.

The invention provides a battery housing, which comprises the previously described device. The invention provides a battery disconnect unit, which comprises the previously described device. The invention provides a battery system, which comprises the previously described device, the previously described battery housing or the previously described battery disconnect unit.

The invention additionally provides a vehicle, in particular a motor vehicle such as an electric motor vehicle, hybrid vehicle or electric motorcycle (electrobike, e-bike), electric pedal cycle (Pedelec), a marine vehicle such as an electric boat, an aircraft or a spacecraft, which comprises the previously described device, connected to the vehicle, the previously described battery housing, connected to the vehicle, and the previously described battery disconnect unit, connected to the vehicle, or the previously described battery system, connected to the vehicle.

The invention additionally provides a computer program, which executes all steps of the previously described method when run on a computer. The invention additionally provides a computer program product, having program code, which is stored on a machine-readable medium, for implementing the previously described method when the program code is executed on a computer or control unit.

BRIEF DESCRIPTION OF THE DRAWINGS

Exemplary embodiments of the invention are represented in the drawings and explained in greater detail in the description that follows.

There are shown in.

DETAILED DESCRIPTION

Figure 1:
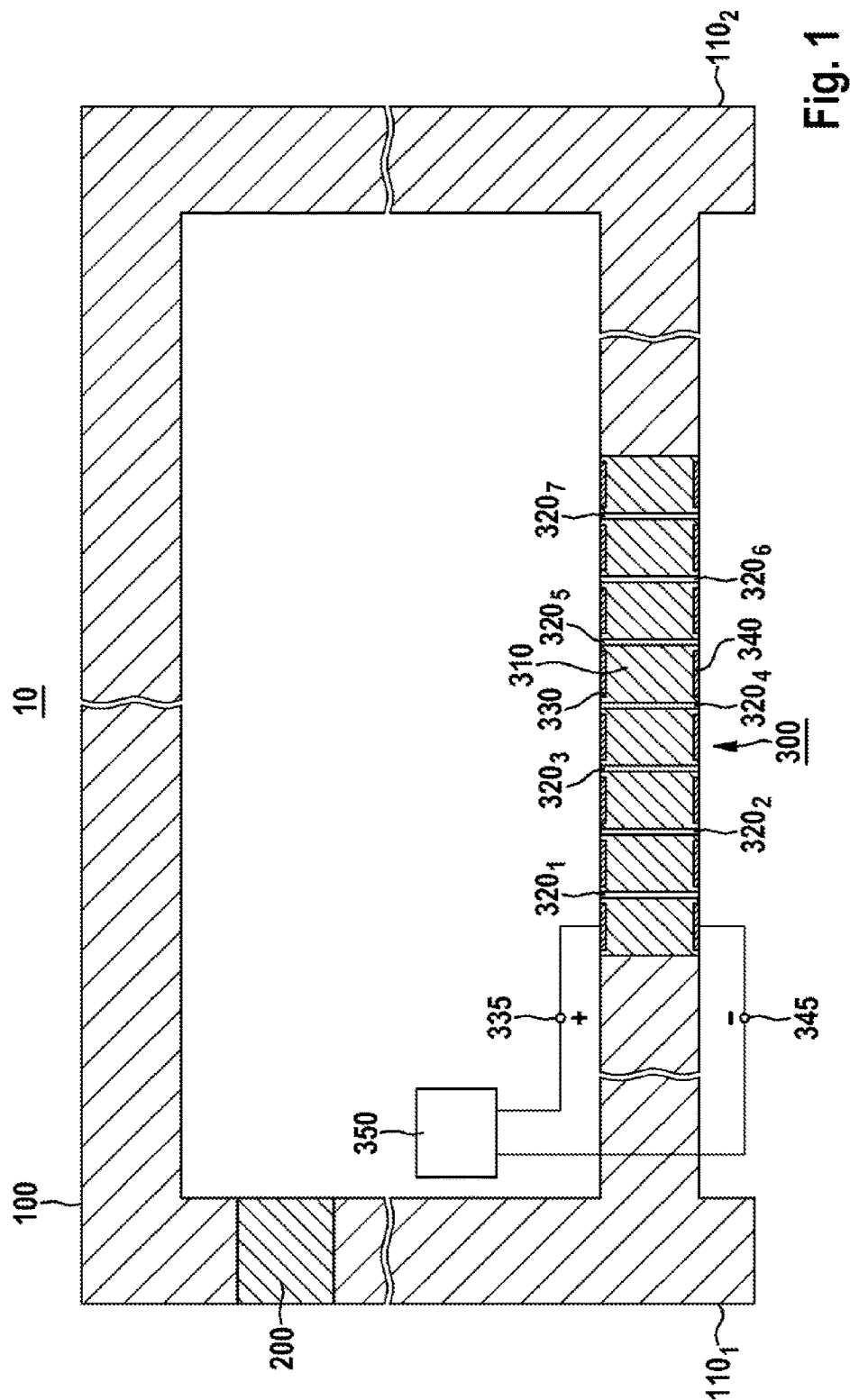
FIG. 1 a schematic side view of a battery system 10 having a device 300 according to an embodiment of the invention, FIG. 2 a schematic top view of the battery system 10 having the device 300 according to the embodiment of the invention, FIG. 3 a schematic side view of a battery system 20 having another device 300 according to the embodiment of the invention, in an open position, FIG. 4 a schematic side view of the battery system 20 having the other device 300 according to the embodiment of the invention, in a closed position, FIG. 5 a schematic side view of a battery system 30 having a device 300 according to another embodiment of the invention, FIG. 6 a schematic side view of a battery system 40 having the device 300 according to the other embodiment of the invention, disposed in a vehicle, FIG. 7 a schematic side view of a battery system 50 having another device 300 according to the other embodiment of the invention, and FIG. 8 a schematic side view of a battery system 60 having a device 300 according to a further embodiment of the invention.

FIG. 1 shows a schematic side view of a battery system 10 having a device 300 according to an embodiment of the invention.

The battery system 10, or the battery disconnect unit, comprises a housing 100, for example a battery housing, and electrical and/or electronic devices (components), for example battery cells, a switching means such as a relay, a switch, a contactor or a power contactor, an overcurrent protective means, such as a fuse means and/or a sensor means, such as a current sensor means.

The components are disposed in an interior of the housing 100. The housing 100 may comprise fastening regions, for example foot regions $110_1$, $110_2$, on an underside of the housing 100.

The battery system 10, or the battery disconnect unit, may additionally comprise a tempering means, such as a cooling means, for tempering the components.

The housing 100 may be designed so as to be hermetically tight, such as liquid-tight or watertight and/or gas-tight. Alternatively, the battery system 10, or the battery disconnect unit, may additionally comprise a pressure compensation element 200, which is disposed in a wall, for example a side wall, of the housing 100, for supplying air to and/or removing air from the battery system 10 or the battery disconnect unit. The pressure compensation element 200 is permeable to air, but impermeable to dust. Ambient air, which always comprises a quantity of water that is dependent on temperature and pressure, can thus enter into the interior through the pressure compensation element 200.

In the case of temperature differences and/or temperature changes, air moisture that is present in the interior may condense, for example on the cooling means, and/or in the case of pressure change, such as changes in air pressure, moisture may enter the housing 100.

The battery system 10, or the battery disconnect unit, additionally comprises a device 300, 350 for removing moisture from the housing 100. The device 300, 350 for removing moisture from the housing 100 comprises a moisture removal means 300 for removing the water (removal of moisture) and a control means 350 for controlling the moisture removal means 300.

The moisture removal means 300 comprises a body 310, which may be realized, for example, as a disk, such as a round disk, or plate, such as a rectangular or square plate. The moisture removal means 300 may be disposed in a base of the housing 100 (housing base), as shown exemplarily in FIG. 1. Alternatively, the moisture removal means 300 may be disposed in a wall, such as a side wall, or in a top cover of the housing 100. The moisture removal device 300 may be, for example, inserted, clamped, screwed or adhesive-bonded into the housing 100. Alternatively, a region of the housing 100 may be realized as a body 310.

The body 310 is realized as an electrical insulator. The body 310 may comprise, for example, a mineral material such as quartz, glass or quartz glass, or a plastic such as polytetrafluorethylene (PTFE, polytetrafluorethene, Teflon). The body 310 (capillary body, capillary disk) comprises a multiplicity of capillary tubes (capillaries) $320_1$-$320_7$, which extend from a first side (upper side) to a second side (underside) of the capillary body 310, the upper side facing toward the interior of the housing 100, and the underside facing toward the environment. The multiplicity of capillary tubes $320_1$-$320_7$ may comprise, for example, from 10 to 1000000 capillary tubes, such as from 100 to 100000, preferably 1000 to 10000. The capillary tubes $320_1$-$320_7$ may be substantially spaced apart from one another, and disposed in a uniform manner on the capillary disk 310. The capillary tubes $320_1$-$320_7$ may be substantially perpendicular to the upper side and underside. The capillary tubes $320_1$-$320_7$ each have a length of from 1 mm to 20 mm, for example from 5 mm to 10 mm. The capillary tubes $320_1$-$320_7$ each have a diameter (internal diameter) of 20 µm to 500 µm, for example from 50 µm to 200 µm, preferably 100 µm.

Disposed on the upper side of the capillary disk 310 there is a first electrode (positive electrode, anode) 330, having a first terminal (positive terminal) 335. Disposed on the underside of the capillary disk 310 there is a second electrode (negative electrode, cathode) 340, having a second terminal (negative terminal) 345. The electrodes 330, 340 comprise an electrically conductive material, for example a metal such as gold, silver or copper, or a metal alloy. The electrodes 330, 340 may be realized, for example, by deposition, such as vapor deposition. In regions at the ends (capillary openings) of the capillary tubes $320_1$-$320_7$, the electrodes each have openings. The openings of the electrodes 330, 340 may have a diameter that is greater than the internal diameter of the capillary tubes $320_1$-$320_7$, such that the electrodes 330, 340 do not reach as far as the capillary openings. The electrodes 330, 340 may be disposed such that they are recessed in the capillary body 310, as shown in FIGS. 1-7. Alternatively, the electrodes 330, 340 may be disposed on the capillary body 310, as shown in FIG. 8.

The control means 350 is connected to the terminals 335, 345 of the moisture removal means 300 in order to control the moisture removal means 300 by means of a control signal. The control signal is a direct voltage in the range of from 1 kV to 50 kV, for example from 2 kV to 20 kV, such as 3 kV (high voltage). The control signal may effect a current of from 100 µA to 500 µA, for example 200 µA to 300 µA, such as 250 µA, and an electroosmotic flow that, due to an electric field, transports the water from the upper side of the capillary disk 310 onto the underside of the capillary disk 310. The water in this case, as a neutral liquid, is not electrolyzed.

The control means 350 may generate the control signal from a voltage that is provided, for example, by the battery cells, by conversion (transformation). The control means 350 may activate the control signal, for example, at regular time intervals, such as 20 min on and 120 min off, or at particular instants, for example, in the case of excess current, on the basis of braking recuperation, or only when the vehicle is moved.

The control signal in this case may comprise a predefined residual ripple, such that the control means 350 can be realized inexpensively by means of a small number of components.

The device for removing moisture from the housing 100 may additionally comprise a sensor means, such as a moisture sensor means and/or temperature sensor means, which is connected to the control means 350, for the purpose of acquiring measurement values such as moisture measurement values or pressure measurement values.

The control means 350 may be realized as an analogue processing means or as a digital processing means. The control means 350 may comprise a processor, a memory and an interface. The control means 350 may be realized as a microcontroller, computer or control unit, such as a battery control unit (BCU). The processor may be realized as a microprocessor. The memory may be realized as a volatile and/or non-volatile memory. The memory serves to store instructions (commands), for example instructions from an operating system and/or application program, and/or data, for example measurement values, parameters, range values, comparison values and tables. The interface serves, for example, to transmit signals from the sensor means to the control means 350, and from the control means 350 to the moisture removal means 300 and/or a (higher-order) control means.

The processor processes the data on the basis of the stored instructions, such that the method for removing moisture from the housing 100 is implemented. The control means 350 may be disposed in the housing 100, as shown in FIG. 1. Alternatively, the control means 350 may be disposed outside of the housing 100.

Figure 2:
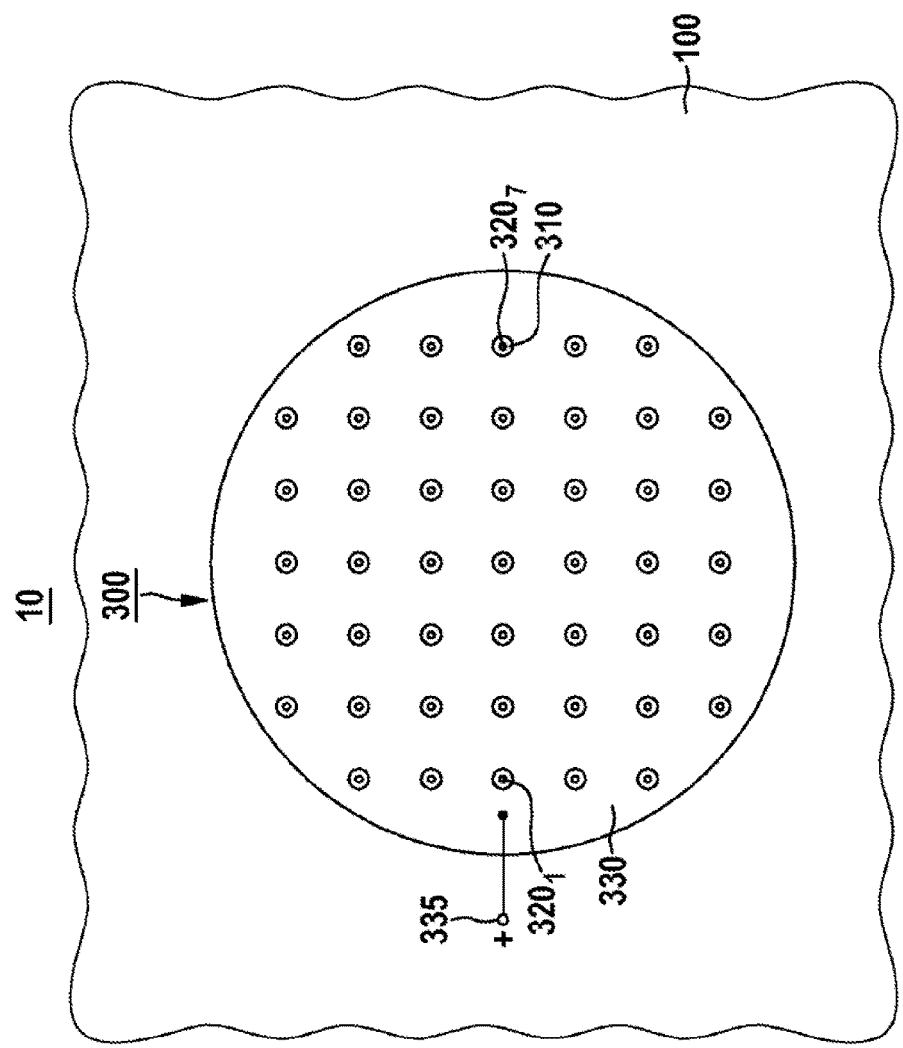

FIG. 2 shows, with reference to FIG. 1, a schematic top view of the battery system 10 having the device 300 according to the embodiment of the invention.

The moisture removal means 300 is realized in the housing base. The capillary body 310 is realized as a round disk. The capillary tubes, for example $320_1$-$320_7$, are substantially spaced apart from one another, and disposed in a uniform manner on the capillary disk 310. The anode 330 on the upper side of the capillary disk 310 does not reach as far as the capillary openings.

Figure 3:
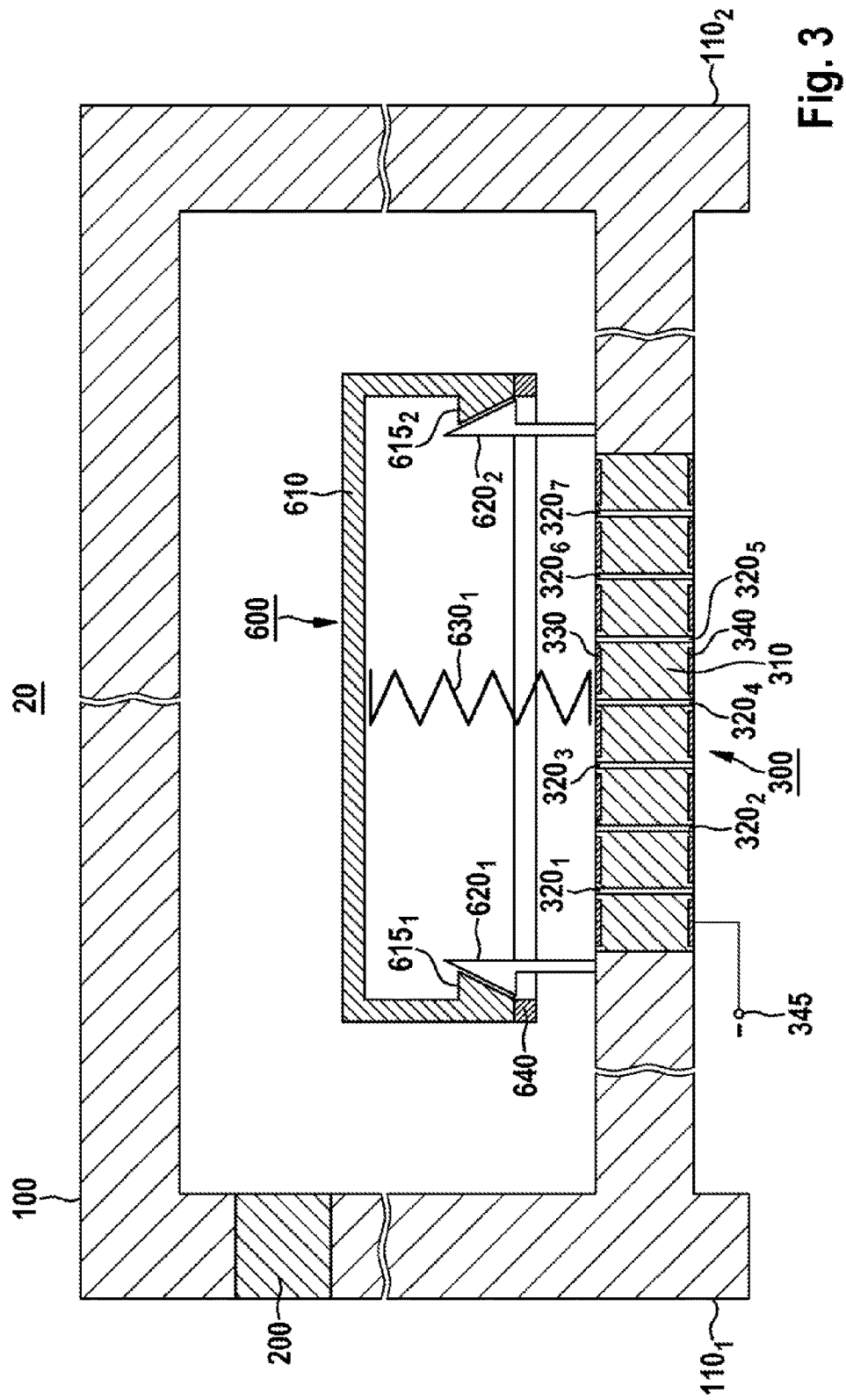

FIG. 3 shows a schematic side view of a battery system 20 having another device 300 according to the embodiment of the invention, in an open position.

If the battery system 20 comprises a degassing system, a noxious gas emerging during the degassing of one or more battery cells is to be given off to the environment by the degassing system in a controlled manner.

The device for removing moisture from the housing 100 additionally comprises an obturating means 600 for obturating the moisture removal means upon emergence of noxious gas. This makes it possible to prevent the noxious gas from emerging into the environment, or into the passenger compartment of a vehicle, in an uncontrolled manner.

Figure 4:
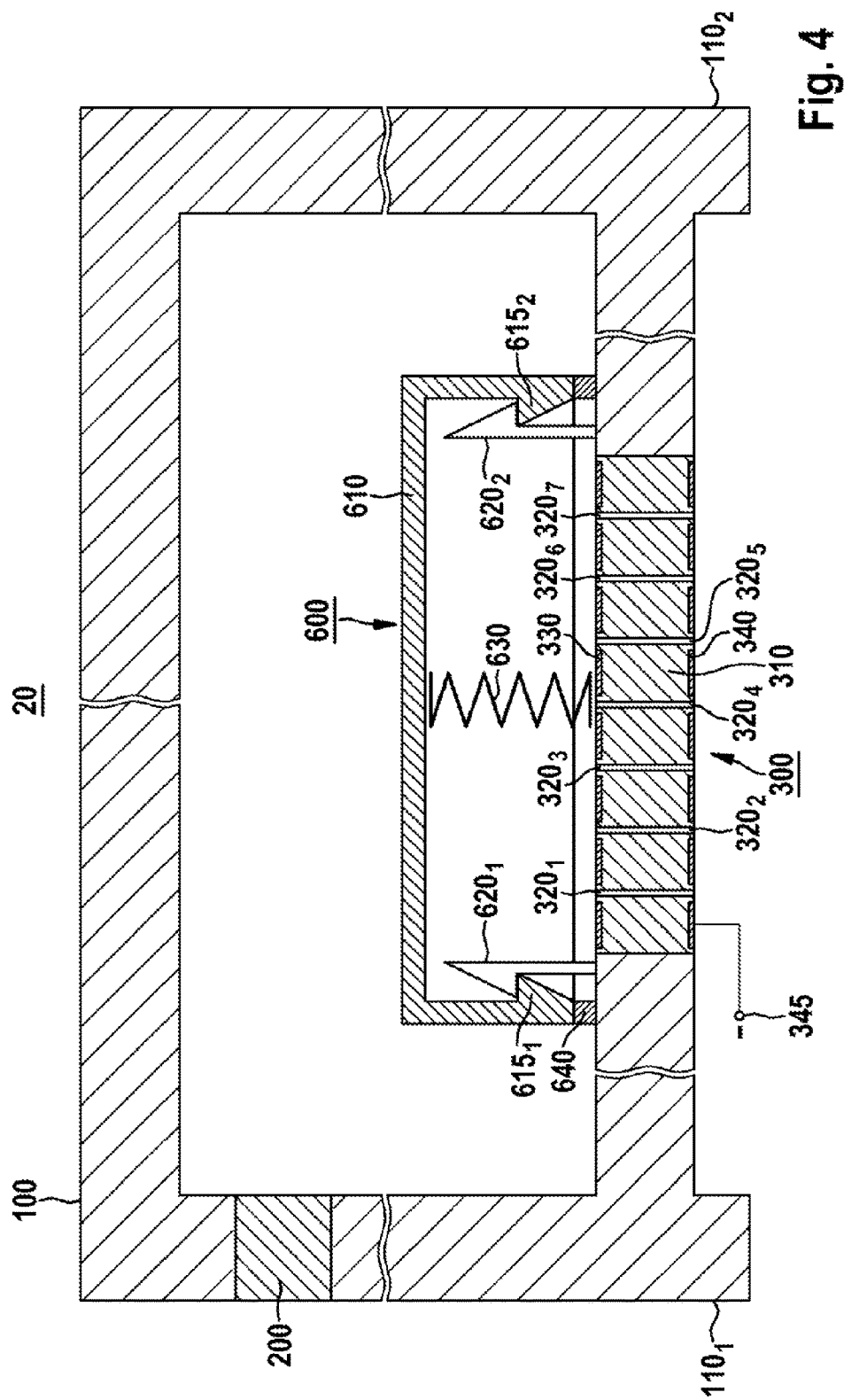

The obturating means 600 may comprise a cover 610, for example a top cover for obturating the capillary body 310. The cover 610, as already described with reference to the capillary body 310, may be, for example, of a round, rectangular or square design. The cover 610 may comprise a latching means $615_1$, $615_2$, such as latching lugs or a latching ring. The obturating means 600 may comprise latching springs $620_1$, $620_2$, which are disposed, for example, on the upper side of the moisture removal means 300 or on the base of the housing 100, for latching in the latching means $615_1$, $615_2$ and locking the cover 610. The latching means $615_1$, $615_2$ and the latching springs $620_1$, $620_2$, as shown in FIGS. 3 and 4, may be disposed inside the cover 610. They can thereby be protected against mechanical damage. Alternatively, they may be disposed outside of the cover 610. This enables the size of the cover 610 to be reduced. The obturating means 600 may additionally comprise a restoring means (spring) 630 for spacing the cover apart from the moisture removal means 300 in the open position, such that moisture can be removed from the housing 100 by means of the device 300, 350.

The obturating means 600 may additionally comprise a seal 640, for example a sealing ring, which is realized on the cover 610. The seal 640 may be, for example, molded on by injection molding, bonded on, vulcanized on or clipped on.

Degassing generates a pressure impulse, which presses the cover 610, against the force of the restoring means 630, in the direction of the moisture removal means 300, such that the latching springs $620_1$, $620_2$ can latch in the latching means $615_1$, $615_2$ and thus lock the cover 610. This enables the emerging noxious gas to be given off to the environment by the degassing system in a controlled manner.

FIG. 4 shows a schematic side view of the battery system 20 having the other device 300 according to the embodiment of the invention, in a closed position.

After the degassing, the latching springs $620_1$, $620_2$ remain in the latching means $615_1$, $615_2$, and the cover 610 remains locked.

Figure 5:
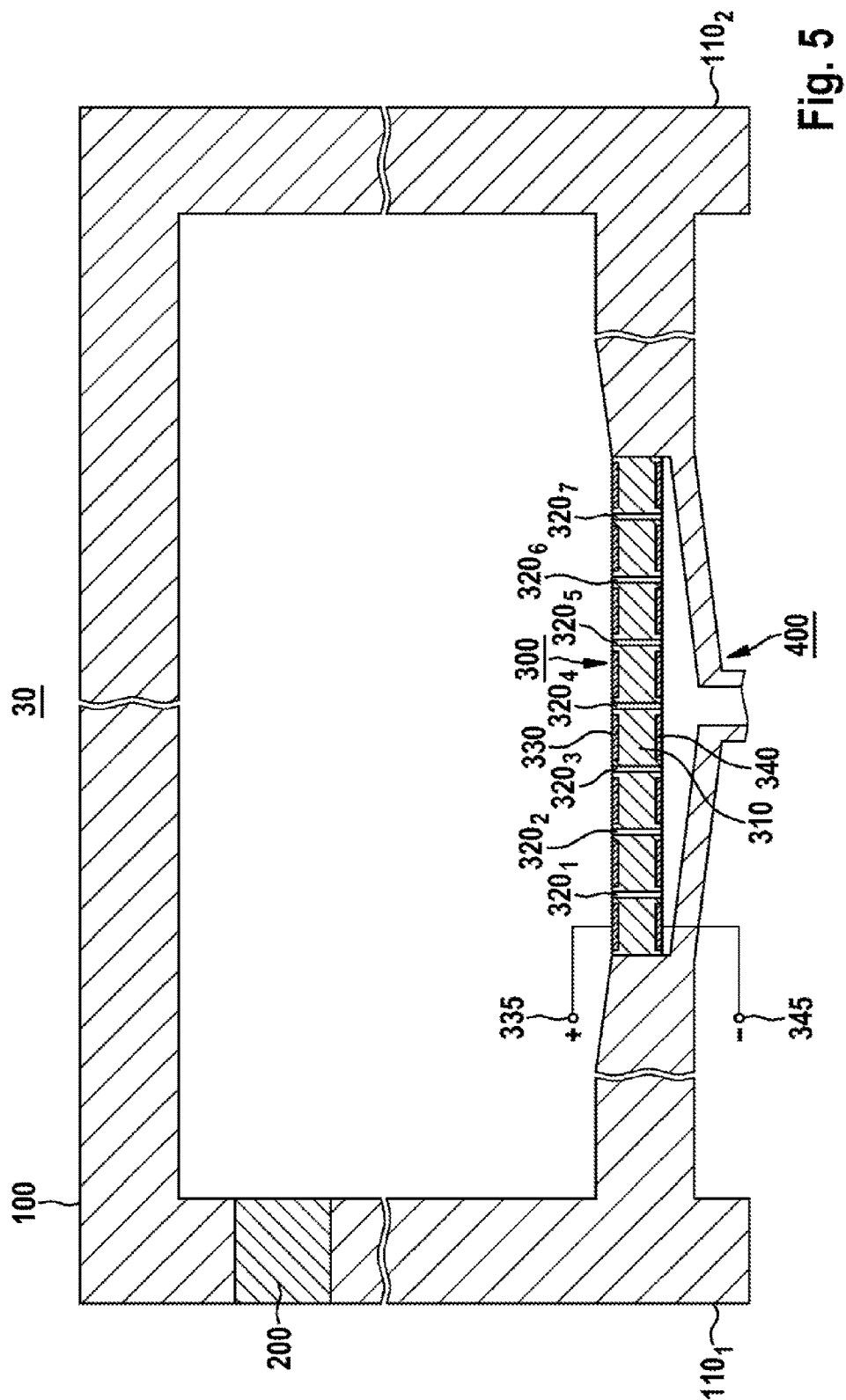

FIG. 5 shows a schematic side view of a battery system 30 having a device 300 according to another embodiment of the invention.

Figure 6:
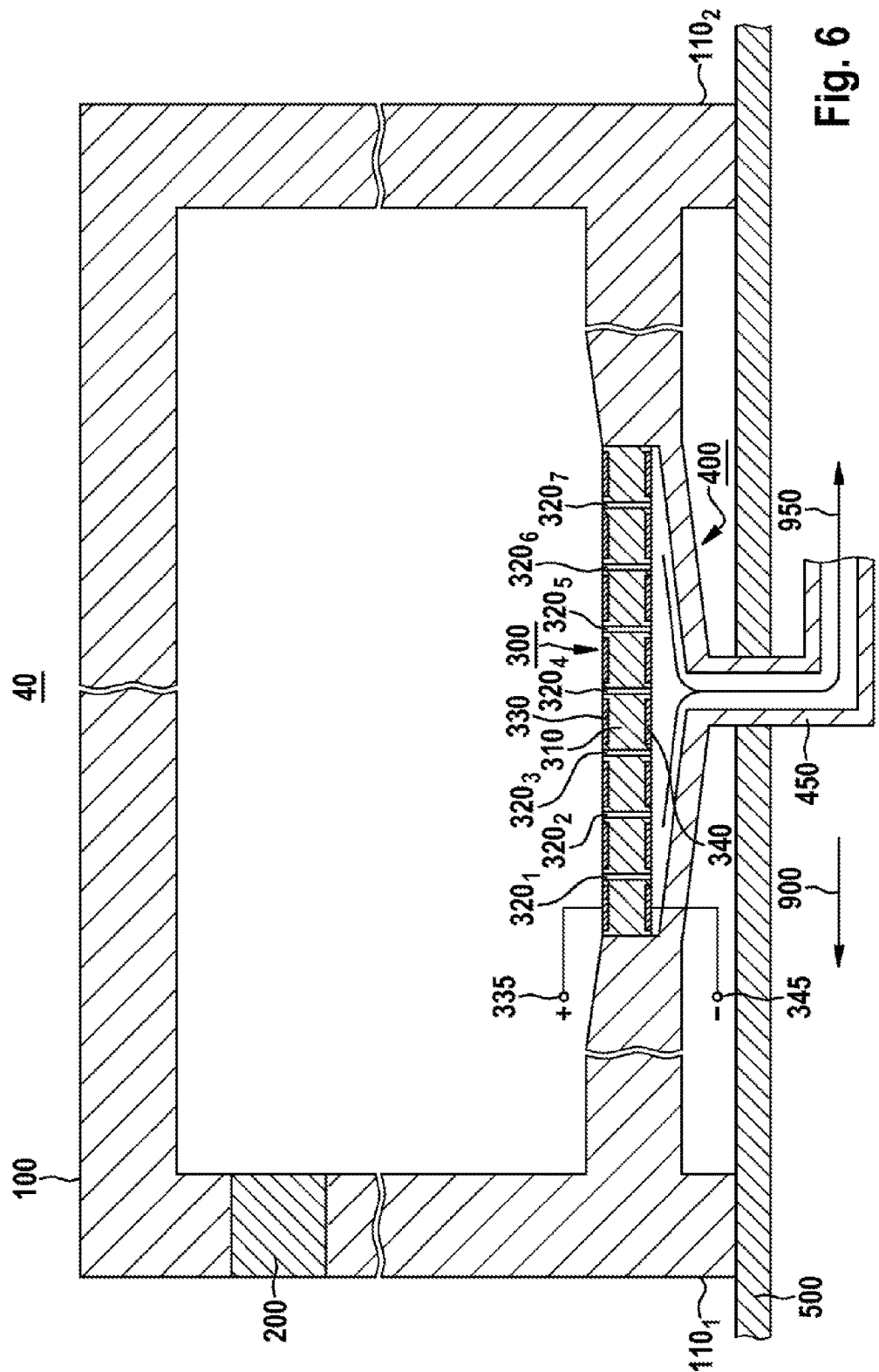

As also shown in FIG. 6, the moisture removal means 300 may be disposed in a recess of the housing body. This enables the water to collect on the surface of the moisture removal means 300. The upper side of the moisture removal means 300 in this case may be at a somewhat greater depth than the upper side of the housing body. The recess may be realized in the centre of the housing base, or of a floor of the housing 100. A mean path of the water to the moisture removal means 300 can thereby be reduced. The upper side of the housing base may be fully or partially beveled in the direction of the moisture removal means 300. The upper side of the housing base may comprise channels or flutes.

The device for removing moisture from the housing 100 may additionally comprise a discharge means 400 for the water removed from the battery. As shown in FIGS. 5 and 6, the discharge means 400 may be realized as a region of the housing base.

FIG. 6 shows a schematic side view of a battery system 40 having the device 300 according to the other embodiment of the invention, disposed in a vehicle.

The battery system 40 is disposed on a base of the vehicle (vehicle base) 500. The discharge means 400 projects through an opening in the vehicle base on an underside of the vehicle, in the direction of the road (not shown). The discharge means 400 comprises an elbow piece 450 (vacuum discharge means).

When the vehicle moves in the direction of the arrow 900, the water removed from the battery is removed from the discharge means 400, 450, as a moist-air aerosol, in the direction of the arrow 950 by means of a suction effect. The vacuum suction extraction therefore does not require a drive. Alternatively, the device for removing moisture from the housing 100 may additionally comprise a vacuum pump. The vacuum pump may be connected to the control means 350, to enable it to be controlled by the control means.

Unlike the pressure impulse generated in the case of a degassing, the suction effect is not sufficient to latch the latching springs $620_1$, $620_2$ in the latching means $615_1$, $615_2$ and thereby lock the cover 610.

Figure 7:
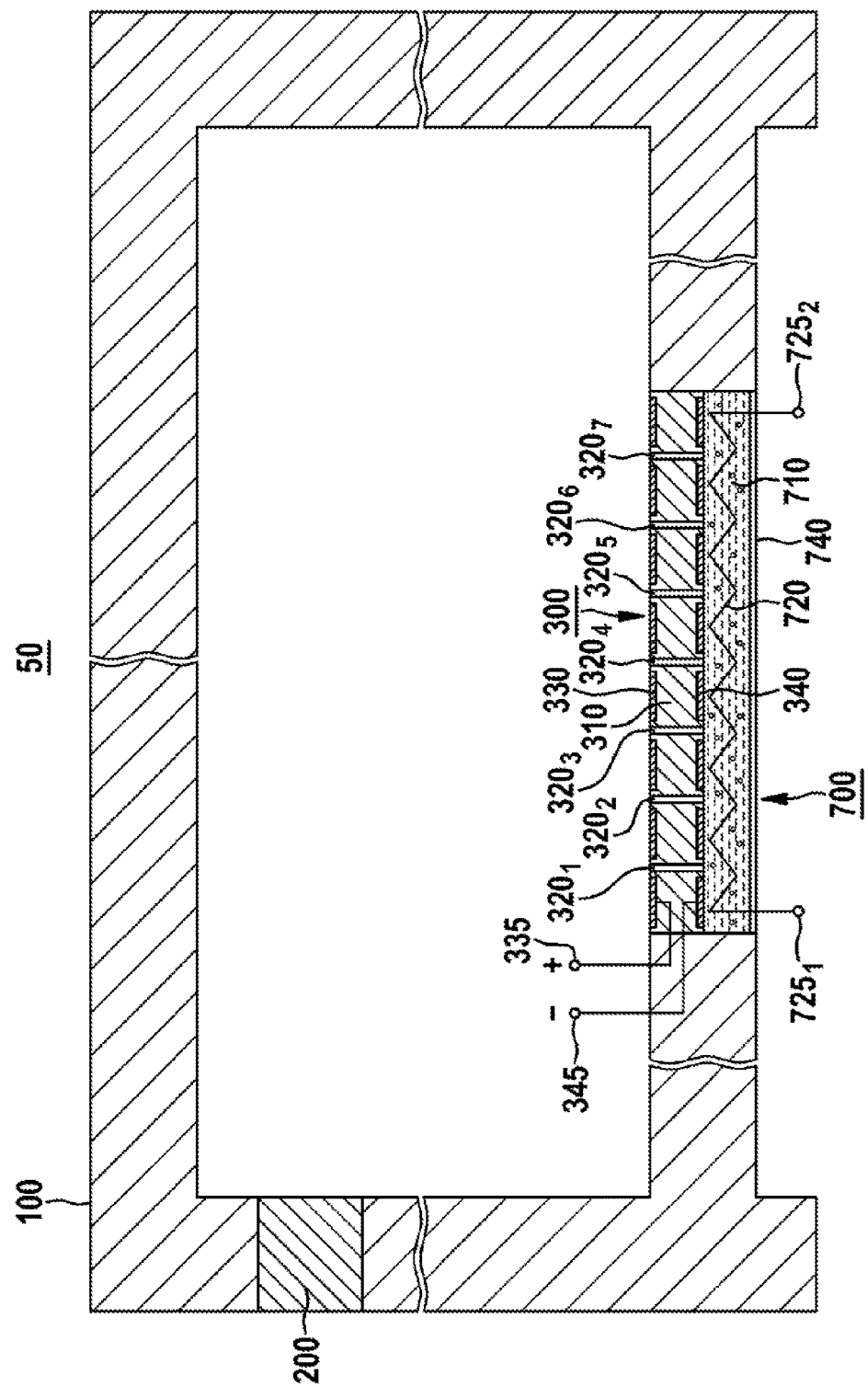
Figure 8:
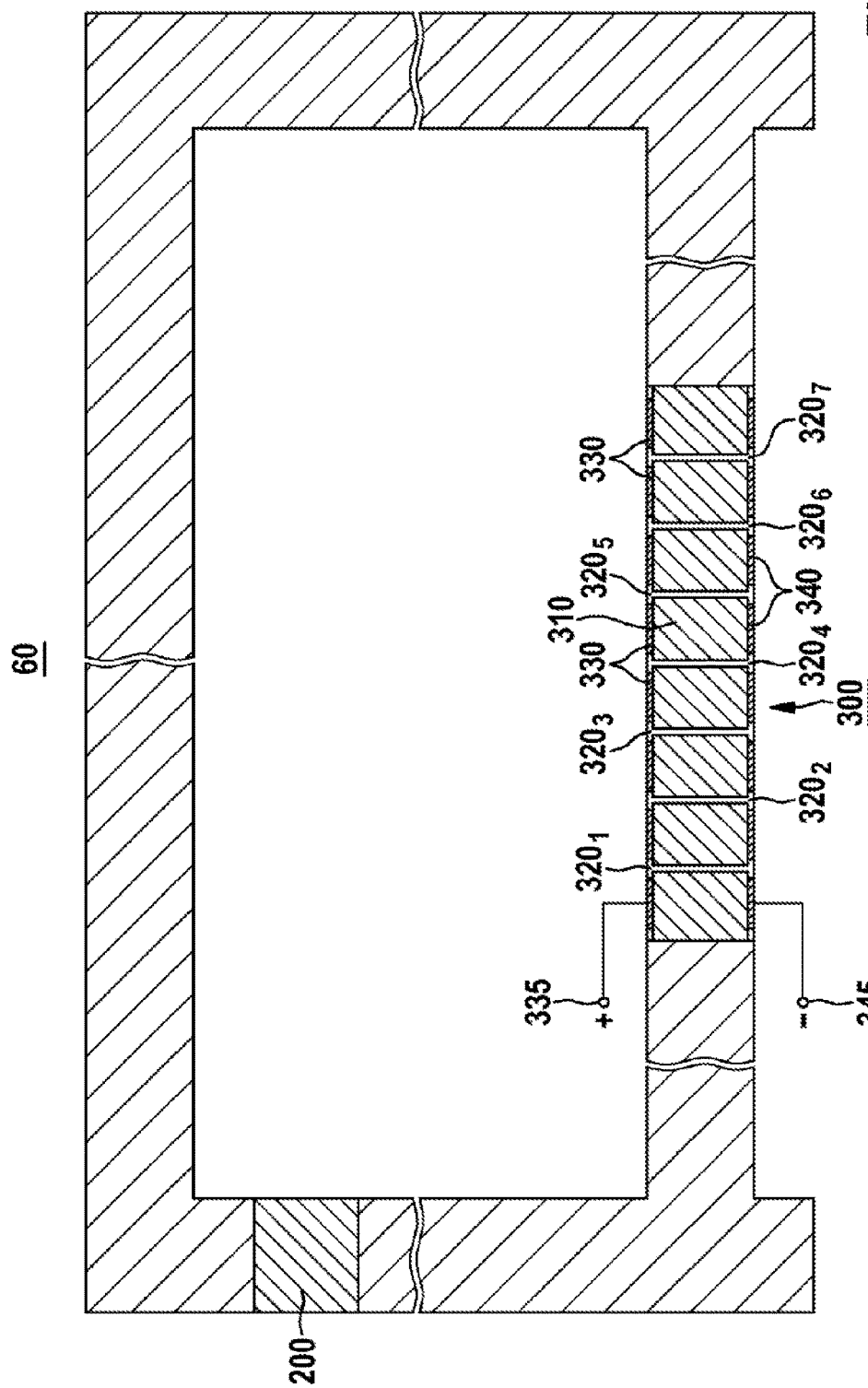

FIG. 7 shows a schematic side view of a battery system 50 having another device 300 according to the other embodiment of the invention.

The device for removing moisture from the housing 100 may additionally comprise a desiccant means 710, 740 for absorbing and/or storing, as temporary storage, the water removed from the battery. The desiccant means 710, 740 may be disposed on the underside of the moisture removal means 300. The desiccant means 710, 740 comprises a desiccant 710, for example a silicate gel or gelatinous silica. The desiccant means 710, 740 may be realized, for example, as a desiccant container having a cover 740. Alternatively, the desiccant means 710, 740 may be realized as a desiccant cartridge. The desiccant container and/or cover 740 or the desiccant cartridge may be separably connected, for example screw-connected, to the housing base. They might also be adhesive-bonded.

The desiccant 710 may be realized as a regenerable desiccant. The desiccant, for example silica gel, may be treated with a water indicator, for example an orange-colored water indicator, such that the desiccant changes color in dependence on the bound quantity of water. The color change is reversible, such that the desiccant becomes light-colored (white) again after being dried, which may be achieved by supplying heat.

Thus, when the desiccant has become saturated, or the water indicator has changed color, the desiccant can be removed from the housing 100, dried and inserted again.

Alternatively the desiccant means may comprise a heating means, for example an electrical resistor 720, such as a resistor wire having electrical terminals $725_1$, $725_2$. When the desiccant has become saturated, therefore, the desiccant can be dried in situ in the desiccant means by applying a voltage, i.e. a direct voltage or alternating voltage, to the terminals $725_1$, $725_2$. The electrical resistor 720 may be connected to the control means 350, to enable it to be controlled by the control means 350.

The desiccant may additionally comprise a sensor means, for example a moisture sensor means, for sensing the moisture, or an optical sensor means, for sensing the change in color. The sensor means may be connected to the control means 350.

FIG. 8 shows a schematic side view of a battery system 60 having a device 300 according to a further embodiment of the invention.

The device for removing moisture from the housing 100 comprises a moisture removal means 300, in which the electrodes 330, 340 are disposed on the capillary body 310.

The feature of the devices 300, for example of the devices 300 shown in FIGS. 3 and 5 or FIGS. 3 and 7, may be combined.

The invention claimed is:

1. A device configured to remove water from an interior of a housing (100) of a battery system or of a battery disconnect unit, the device comprising:
    a body (310) having a multiplicity of capillaries ($320_1$-$320_7$) communicating with an interior of the housing, and electrodes (330, 340) for generating an electric field,
    a controller (350) configured to control the electric field to remove the water from the interior of the housing through the capillaries ($320_1$-$320_7$), and
    a closure device (600) configured to close off the body (310) relative to the interior of the housing.

2. The device as claimed in claim 1, wherein:
    the closure device (600) comprises a cover (610) having a latching means ($615_1$, $615_2$) and latching springs ($620_1$, $620_2$) for latching in the latching means ($615_1$, $615_2$) and locking the cover (610).

3. The device as claimed in claim 1, additionally comprising:
    a discharge means (400, 450), for discharging the removed water.

4. The device as claimed in claim 1, additionally comprising:
    a desiccant means (710, 720, $725_1$, $725_2$, 740), for absorbing the removed water.

5. The device as claimed in claim 1, additionally comprising:
    a vacuum discharge means (450), for discharging the removed water.

6. The device as claimed in claim 1, additionally comprising:
a heatable desiccant means (710, 720, 725$_1$, 725$_2$, 740), for absorbing the removed water.

7. A battery housing comprising:
the device as claimed in claim 1.

8. A battery disconnect unit, comprising:
the device as claimed in claim 1.

9. A battery system (10; 20; 30; 40; 50; 60), comprising:
the device as claimed in claim 1.

10. A vehicle, comprising:
the device as claimed in claim 1.

11. A method for removing water from an interior of a housing (100) of a battery system or of a battery disconnect unit, the method comprising:
providing a body (310), having a multiplicity of capillaries (320$_1$-320$_7$) communicating with the interior of the housing, and electrodes (330, 340) for generating an electric field,
providing a controller (350) configured to control the electrical field to remove the water from the interior of the housing through the capillaries,
controlling the electric field with the controller to remove the water from the interior of the housing through the capillaries (320$_1$-320$_7$), and
providing a closure device (600) configured to close off the body (310) relative to the interior of the housing.

12. The method as claimed in claim 11, wherein providing a closure device includes:
providing a cover (610) having a latching means (615$_1$, 615$_2$), and
providing latching springs (620$_1$, 620$_2$) for latching in the latching means (615$_1$, 615$_2$), and locking the cover (610).

13. The method as claimed in claim 11, additionally comprising:
providing a discharge means (400, 450), for discharging the removed water.

14. The method as claimed in claim 11, additionally comprising:
providing a desiccant means (710, 720, 725$_1$, 725$_2$, 740), for absorbing the removed water.

* * * * *